(12) United States Patent
Xu et al.

(10) Patent No.: US 11,925,134 B2
(45) Date of Patent: Mar. 12, 2024

(54) MULTILAYERED RAIL GUIDE VEHICLE SYSTEM FOR USE IN THREE-DIMENSIONAL PLANTING IN PLANT FACTORY, AND CONTROL METHOD THEREFOR

(71) Applicant: INSTITUTE OF URBAN AGRICULTURE, CHINESE ACADEMY OF AGRICULTURAL SCIENCES, Sichuan (CN)

(72) Inventors: Yaliang Xu, Sichuan (CN); Qichang Yang, Sichuan (CN); Jiabao Wang, Sichuan (CN); Lei Zhang, Sichuan (CN); Chengchao Xue, Sichuan (CN); Yi Zheng, Sichuan (CN); Zhonghui Han, Sichuan (CN); Yinjian Zheng, Sichuan (CN)

(73) Assignee: INSTITUTE OF URBAN AGRICULTURE, CHINESE ACADEMY OF AGRICULTURAL SCIENCES, Sichuan (CN)

( * ) Notice: Subject to any disclaimer, the term of this patent is extended or adjusted under 35 U.S.C. 154(b) by 0 days.

(21) Appl. No.: 18/550,505

(22) PCT Filed: Dec. 3, 2021

(86) PCT No.: PCT/CN2021/135374
§ 371 (c)(1),
(2) Date: Sep. 14, 2023

(87) PCT Pub. No.: WO2022/257382
PCT Pub. Date: Dec. 15, 2022

(65) Prior Publication Data
US 2024/0032458 A1 Feb. 1, 2024

(30) Foreign Application Priority Data

Jun. 8, 2021 (CN) .......................... 202110635288.X (51) Int. Cl.
*B25J 5/02* (2006.01)
*A01C 14/00* (2006.01)
(Continued)

(52) U.S. Cl.
CPC ................ *A01C 14/00* (2013.01); *A01G 9/26* (2013.01); *B25J 5/02* (2013.01); *B65G 1/0492* (2013.01);
(Continued)

(58) Field of Classification Search
CPC .......... A01G 9/26; A01G 9/028; A01G 31/02; A01G 31/06; B25J 5/02; B62G 1/0492;
(Continued)

(56) References Cited

U.S. PATENT DOCUMENTS 10,795,350 B2 * 10/2020 Cella ................ G05B 19/41865
11,199,837 B2 * 12/2021 Cella .................. G05B 19/4185
(Continued)

FOREIGN PATENT DOCUMENTS

| CN | 104891136 A | 9/2015 |
| CN | 107992109 A | 5/2018 |

(Continued)

OTHER PUBLICATIONS

Fei et al., Design and experimental test of multi-functional intelligent vehicle for greenhouse, 2021, IEEE, p. 755-760 (Year: 2021).*
(Continued)

*Primary Examiner* — McDieunel Marc
(74) *Attorney, Agent, or Firm* — Mark T. Vogelbacker; Eckert Seamans Cherin & Mellott, LLC (57) ABSTRACT

A multilayered rail guide vehicle system for use in three-dimensional planting in a plant factory and a control method therefor, the system includes an upper computer, cultivation shelves, traveling devices, lifting devices, and an electric control system. The traveling devices and the lifting devices
(Continued)

are arranged in a body of a rail guide vehicle. The upper computer is in wireless communication with the electric control system. A nutrient solution tank is arranged on each of the cultivation shelves, and a plurality of cultivation positions are arranged on the nutrient solution tank. The electric control system is arranged in the body of the rail guide vehicle, so as to obtain an operation mode and target information after receiving a task instruction transmitted by the upper computer, select and switch a positioning mode, and drive the traveling devices and the lifting devices to perform traveling and lifting positioning according to operation procedures.

7 Claims, 9 Drawing Sheets (51) Int. Cl.
  *A01G 9/26* (2006.01)
  *B65G 1/04* (2006.01)
  *A01G 9/02* (2018.01)
(52) U.S. Cl.
  CPC ...... *A01G 9/028* (2013.01); *B65G 2203/0283* (2013.01)
(58) Field of Classification Search
  CPC .......... B65G 2203/0283; B65G 1/0407; B65G 61/00; B65G 43/00; B65G 1/0492; B65G 35/00; Y02P 60/21
  See application file for complete search history.

(56) References Cited

U.S. PATENT DOCUMENTS

| | | | |
|---|---|---|---|
| 11,209,813 B2* | 12/2021 | Cella | H04L 67/1097 |
| 11,231,705 B2* | 1/2022 | Cella | H04L 1/0002 |
| 2021/0157312 A1* | 5/2021 | Cella | G01M 13/045 |
| 2022/0108262 A1* | 4/2022 | Cella | G06Q 10/063118 |

FOREIGN PATENT DOCUMENTS

| | | |
|---|---|---|
| CN | 209973398 U2 | 1/2020 |
| CN | 111651245 A | 9/2020 |
| CN | 211416639 U | 9/2020 |
| CN | 113548353 A | 10/2021 |
| WO | 2007/028624 A1 | 3/2007 |

OTHER PUBLICATIONS

Savall et al., Two compact robots for remote inspection of hazardous areas in nuclear power plants, 2002, IEEE, p. 1993-1998 (Year: 2002).*

Tangarife et al., Robotic applications in the automation of agricultural production under greenhouse: A review, 2017, IEEE, p. 1-6 (Year: 2017).*

Feng et al., Design and Test of Harvesting Robot for Table-top Cultivated Strawberry, 2019, IEEE, p. 80-85 (Year: 2019).*

Xiaofeng, C., Application analysis of intelligent shuttle system in plant factory, Authoritative Forum, 2018, pp. 100-101.

Office Action for Chinese App. No. 202110635288.X, dated Jul. 21, 2022.

Notification to Grant Patent Right for Invention or Chinese App. No. 202110635288.X, dated Dec. 9, 2022.

* cited by examiner

MULTILAYERED RAIL GUIDE VEHICLE SYSTEM FOR USE IN THREE-DIMENSIONAL PLANTING IN PLANT FACTORY, AND CONTROL METHOD THEREFOR

CROSS-REFERENCE TO RELATED APPLICATION

This application is a national stage application of International Patent Application No. PCT/CN2021/135374, filed on Dec. 3, 2021, which claims priority of the Chinese Patent Application No. 202110635288.X, filed on Jun. 8, 2021, both of which are incorporated by references in their entities.

TECHNICAL FIELD

The present disclosure relates to the field of intelligent agricultural equipment, and in particular, to a multilayered rail guide vehicle system for use in three-dimensional planting in a plant factory, and a control method therefor.

BACKGROUND

Plant factory is an efficient agricultural system that realizes annual continuous production of crops through high-accuracy environmental control in facilities, and is a new production manner that automatically controls environmental conditions such as temperature, humidity, light, $CO_2$ concentration, and nutrient solutions in a plant growth process by a computer and that is not or rarely constrained by natural conditions. In the plant factory, the light required for crop growth is provided by an artificial light source, and required nutrients are provided by the nutrient solutions, which realizes an efficient production in a controllable environment.

According to a planting life cycle of the crops, the plant factory may be divided into several functional areas such as a sowing area, a nursery area, a cultivation area, a thinning area, and a harvesting area. In a planting process, the crops need to be repeatedly handled back and forth between various areas. At present, an overall structural design of the plant factory tends to be perfect, but it lacks of an automatic logistics system, and logistics handling operations generally rely on manual labor. A traditional manual handling manner has high labor intensity and low work efficiency, a multilayer cultivation shelf is relatively high, and the number of cultivation layers can reach over 20 layers at present, which has inconvenience in manual handling. In addition, there is an interference caused by human factors in a production process, which has an adverse impact on the quality and hygiene of the crops to a certain extent. Long-term work in the cultivation area with over-high $CO_2$ concentration will also pose risks to human health. Therefore, designing automatic logistics equipment suitable for three-dimensional planting in the plant factory is very necessary and has significant value.

At present, individual manufacturers have attempted to introduce traditional warehousing logistics automation equipment, such as stackers and multilayered rail guide vehicles, into plant factories. The warehousing logistics automation equipment realizes automatic and unmanned handling operations, and remarkably improves the production efficiency. However, such equipment also has obvious disadvantages:

1, only standardized cargo units can be treated, and crops, cultivation boards, and nutrient solutions can only be packed according to turnover box type cargo units; under this planting condition, the nutrient solutions cannot be cycled, and their composition proportions cannot be detected and adjusted effectively, which is adverse to crop growth;

2, roadway space needs to be reserved as a running channel for the stackers and the multilayered rail guide vehicles, which occupies valuable planting space; and 3, packing and unpacking processes and actions of the turnover box type cargo units (cultivation units) are relatively complex.

SUMMARY

In order to meet three-dimensional multilayered dense planting in a plant factory and realize logistics automation (handling), intelligent and efficient operation, and sterile production, the present disclosure provides a multilayered rail guide vehicle system for use in three-dimensional planting in a plant factory, and a control method therefor.

In order to achieve the above objectives, the technical solution adopted by the present disclosure is that:

A multilayered rail guide vehicle system for use in three-dimensional planting in a plant factory includes an upper computer, cultivation shelves, an electric control system and traveling devices and lifting devices communicated with the electric control system. The traveling devices and the lifting devices are arranged in a body of a rail guide vehicle;

the upper computer is in wireless communication with the electric control system, and is configured for transmitting a task instruction to the electric control system;

a nutrient solution tank is arranged on each of the cultivation shelves, and cultivation positions are continuously distributed without gaps along the nutrient solution tank according to length of each of the cultivation shelves; the body of the rail guide vehicle takes the cultivation shelves on both sides of the nutrient solution tank as railways to carry the cultivation boards to move on the nutrient solution tank, and places the cultivation boards at the cultivation positions;

the traveling devices comprise two traveling devices and the lifting devices comprise two lifting devices; the traveling devices and the lifting devices are symmetrically arranged on both sides of the rail guide vehicle respectively; the electric control system is arranged in the body of the rail guide vehicle;

the traveling devices are configured for receiving a control instruction of the electric control system, so that the body of the rail guide vehicle moves on the railways on the cultivation shelves;

the lifting devices are configured for lifting the cultivation boards and completing loading and unloading operations of the cultivation boards;

the electric control system is configured for obtaining an operation mode and target information after receiving the task instruction transmitted by the upper computer, selecting and switching a positioning mode according to the operation mode and the target information, and controlling the traveling devices to perform traveling motion; and a driving device controls the lifting devices to perform lifting motion.

Each of the traveling devices is arranged on one side of the body of the rail guide vehicle and includes two traveling wheels, two belt pulleys, a synchronous belt, and a servo motor;

the two traveling wheels are respectively and fixedly arranged at a bottom of one side of the body of the rail guide vehicle; the two belt pulleys are respectively and fixedly arranged at a top of one side of the body of the rail guide vehicle;

the two traveling wheels are in transmission connection with the two belt pulleys through the synchronous belt, so as to realize synchronous rotation;

the two belt pulleys are connected to the servo motor, and the servo motor is electrically connected to the electric control system; and a wheel flange is arranged on each of the two traveling wheels, so that the two traveling wheels are embedded into one of the cultivation shelves on both sides of the nutrient solution tank, to realize a guide effect in a traveling process of the body of the rail guide vehicle.

Each of the lifting devices includes a lifting motor, an eccentric shaft mechanism, linear guide rods, a lifting block, and a lifting board;

the lifting motor is electrically connected to the electric control system;

an output shaft of the lifting motor is connected to an input shaft segment of the eccentric shaft mechanism via a shaft coupling; an output shaft segment of the eccentric shaft mechanism is abutted with the lifting block; the lifting motor drives an eccentric wheel to rotate, so that the output shaft segment is displaced up and down, thereby ascending or descending of the lifting block;

the lifting block is fixedly connected to a midpoint of a bottom of the lifting board, so as to drive the lifting board to ascend or descend by means of the ascending or the descending of the lifting block;

the linear guide rods are also arranged at two ends of the bottom of the lifting board; and the linear guide rods are configured for providing guide for the ascending or the descending of the lifting board.

The system further includes rescue devices communicated with the electric control system. The rescue devices comprise two rescue devices, and are symmetrically arranged on both sides of the body of the rail guide vehicle, and are configured for lapping a body of another rail guide vehicle, so that the rail guide vehicle and the other rail guide vehicle are able to tow each other, so as to realize an emergency rescue operation of the body of the rail guide vehicle. Each of the rescue devices includes butt hooks and butt slots;

the butt hooks are rotatably arranged on both sides of the body of the rail guide vehicle in a forward direction, and the butt hooks are able to horizontally extend to outside the body of the rail guide vehicle; and pawl parts are arranged at extending front ends of the butt hooks, and stop blocks are arranged at extending rear ends of the butt hooks;

the butt slots are arranged on both sides of the body of the rail guide vehicle in a backward direction, and boss structures are arranged in the butt slots;

after the butt hooks of the rail guide vehicle extend out, the butt hooks of the rail guide vehicle are horizontally inserted into the butt slots of rescue devices of the body of the other rail guide vehicle; and after front ends of the pawl parts of the rail guide vehicle slide over the boss structures of the other rail guide vehicle, the stop blocks at rear ends of the rail guide vehicle are engaged with the boss structures of the other rail guide vehicle, so as to realize interlocking between the body of the rail guide vehicle and the body of the other rail guide vehicle.

The electric control system includes a vehicle mounted controller, and a traveling addressing device, a driving device, a wireless messaging device, and a sensor communicated with the vehicle mounted controller;

the traveling addressing device includes a laser range finder and an encoder;

the laser range finder is arranged at an upper part of the body of the rail guide vehicle in the forward direction, is electrically connected with the vehicle mounted controller, and is configured for detecting an absolute position of the body of the rail guide vehicle relative to a reference plane, and feeding back data of the absolute position to the vehicle mounted controller;

the encoder is connected with the driving device, and is configured for detecting a rotation angle of a motor shaft to obtain code value data and feeding back the code value data to the driving device in real time;

the driving device is a Direct Current (DC) servo driver, is electrically connected to each of a servo motor of the traveling device and the lifting motor of the lifting device, and is configured for switching a positioning mode of the traveling device according to a task instruction transmitted by the vehicle mounted controller and controlling the traveling device to perform the traveling motion and the lifting device to perform the lifting motion;

the wireless messaging device is a wireless client, and is configured for realizing communication interaction between the vehicle mounted controller and the upper computer;

the sensor is configured for collecting state information of the cultivation boards; and the vehicle mounted controller is a Programmable Logic Controller (PLC) in a motion control type, and is configured for obtaining an operation mode and target information after receiving the task instruction transmitted by the upper computer by means of the wireless messaging device, selecting and switching the positioning mode of the driving device according to the operation mode and the target information, and transmitting the task instruction transmitted by the upper computer to the driving device according to the data of the absolute position fed back by the laser range finder and the code value data fed back by the encoder.

A control method for a multilayered rail guide vehicle system for use in three-dimensional planting in a plant factory includes following steps:

1) transmitting, by an upper computer, a task instruction that needs to be executed to a vehicle mounted controller by means of a wireless messaging device of an electric control system;

2) obtaining an operation mode and target information by the vehicle mounted controller after receiving the task instruction transmitted by the upper computer by means of the wireless messaging device, and selecting and switching a positioning mode of a driving device according to the operation mode and the target information; and 3) generating, by the driving device, a driving current according to data of an absolute position fed back by a laser range finder and code value data fed back by an encoder (23), and controlling a traveling device to perform traveling motion and a lifting device to perform lifting motion.

The operation mode includes handling of cultivation boards on a same layer, handling of the cultivation boards between layers or shelves, and an emergency rescue operation;

the target information includes a target position and a target velocity of an operation of a body of a rail guide vehicle; and the positioning mode of the driving device includes a full-closed loop positioning mode or a semi-closed loop positioning mode.

The positioning mode of the driving device adopts a full-closed loop positioning mode or a semi-closed loop positioning mode.

The positioning mode of the driving device includes a full-closed loop positioning mode and a semi-closed loop positioning mode.

The full-closed loop positioning mode is specifically as follows:

receiving, by the vehicle mounted controller, an absolute position fed back by the laser range finder in real time according to the operation mode and the target information in the task instruction received, and dynamically adjusting the target velocity in real time according to a deviation between the absolute position and a current position, and transmitting the target velocity to the driving device;

detecting, by the encoder, a rotation angle of a motor shaft in a traveling device, acquiring, by the driving device, the code value data and calculating to obtain a real-time velocity of the body of the rail guide vehicle, dynamically adjusting the driving current in real time according to a velocity deviation between the real-time velocity and the target velocity, and controlling the traveling device to perform the traveling motion; and controlling, by the driving device, the lifting device to perform the lifting motion to complete control of the full-closed loop positioning mode.

The semi-closed loop positioning mode is specifically as follows:

transmitting, by the vehicle mounted controller, the target information to the driving device according to the task instruction received;

feeding back, by the encoder, the code value data to the driving device in real time, and calculating by the driving device according to the target information and the code value data received to obtain a real-time position and a real-time velocity;

obtaining, by the driving device, a position deviation and a velocity deviation according to the real-time position and the real-time velocity, and outputting the driving current, so as to control the traveling device to perform the traveling motion; controlling, by the driving device, the lifting device to perform the lifting motion to complete control of the semi-closed loop positioning mode.

In step 2), the operation of selecting and switching a positioning mode of a driving device according to the operation mode and the target information is specifically as follows:

when the operation mode is handling of the cultivation boards on the same layer, the laser range finder takes a reflector mounted at the target position on a cultivation shelf as a measurement reference plane; at a same time, the electric control system works in the full-closed loop positioning mode;

when the operation mode is handling of the cultivation boards between layers, the laser range finder takes a reflector mounted at the target position on a cultivation shelf as a measurement reference plane; at a same time, the electric control system works in the full-closed loop positioning mode;

when the operation mode is handling of the cultivation boards between shelves, the body of the rail guide vehicle enters and exists a Rail Guide Vehicle (RGV); and at a same time, the electric control system works in the semi-closed loop positioning mode.

The present disclosure has the following beneficial effects and advantages:

1. handling objects of the multilayered rail guide vehicle provided by the present disclosure are cultivation boards, and the cultivation boards do not need to be packed into a turnover box type cargo unit, thereby avoiding packing and unpacking processes;
2. the present disclosure realizes decoupling between the cultivation boards and the nutrient solution tank, realizing cycling of nutrient solutions, and facilitating detecting and controlling the composition proportions of the nutrient solutions;
3. the multilayered rail guide vehicle provided by the present disclosure is compact in structure, and can enter the space inside a cultivation layer, so that narrow and small space above the crops is used as a running channel of the rail guide vehicle; compared with the traditional logistics handling equipment, the utilization rate of planting space is greatly improved;
4. the multilayered rail guide vehicle provided by the present disclosure can realize the movement between the layers of a cultivation shelf and shelves of the cultivation shelves by means of the transferring of peripheral handling equipment (an elevator, the RGV, and an Automatic Guided Vehicle (AGV)), which greatly improves the equipment utilization rate and the system flexibility; and
5. the multilayered rail guide vehicle provided by the present disclosure has a fault rescue function, which greatly improves the maintainability of the system.

BRIEF DESCRIPTION OF THE DRAWINGS

FIG. 10 is a control flowchart of a semi-closed loop positioning mode of the present disclosure; and reference signs in the drawings: 1, traveling device; 2, lifting device; 3, rescue device; 4, electric control system; 5, cultivation shelf; 6, cultivation board; 7, nutrient solution tank; 8, traveling wheel; 9, belt pulley; 10, synchronous belt; 11, wheel flange; 12, lifting motor; 13, eccentric shaft mechanism; 14, linear guide rod; 15, butt hook; 16, butt slot; 17, vehicle mounted controller; 18, driving device; 19, super capacitor; 20, wireless communication device; 21, sensor; 22, laser range finder; 23, encoder; 24, current collector; 201, lifting block; 202, shaft coupling; and 203, lifting board.

DETAILED DESCRIPTION OF THE EMBODIMENTS

The present disclosure will be further described in detail below with reference to the accompanying drawings and embodiments.

Figure 1:
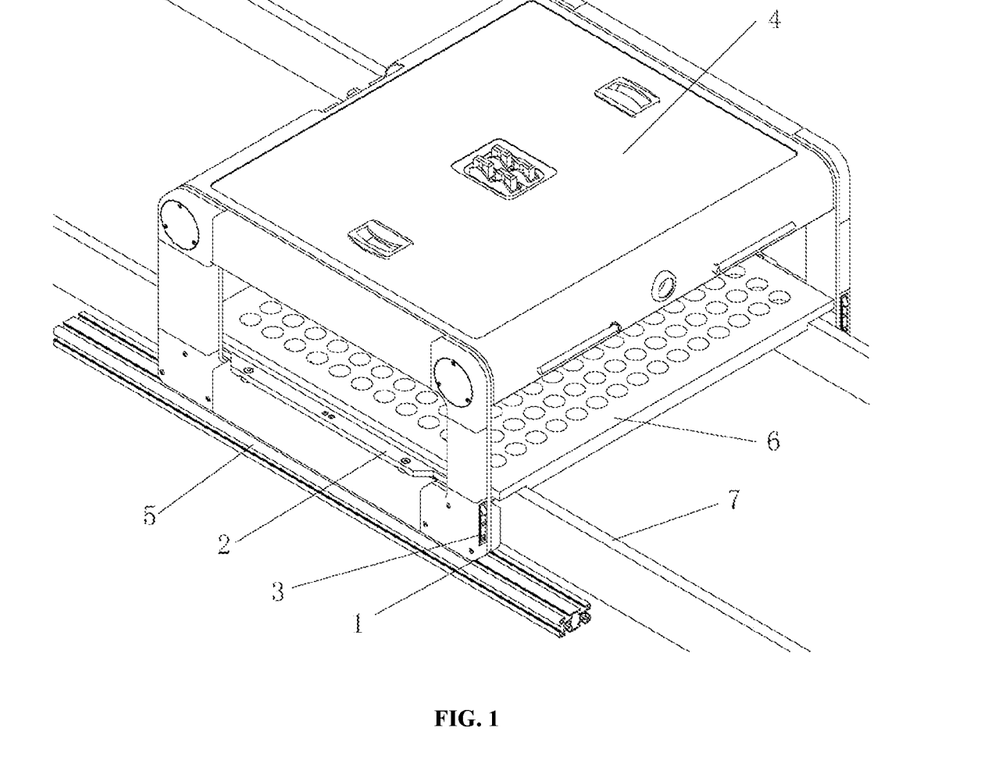
FIG. 1 is an appearance diagram of a multilayered rail guide vehicle system of the present disclosure.
Figure 2:
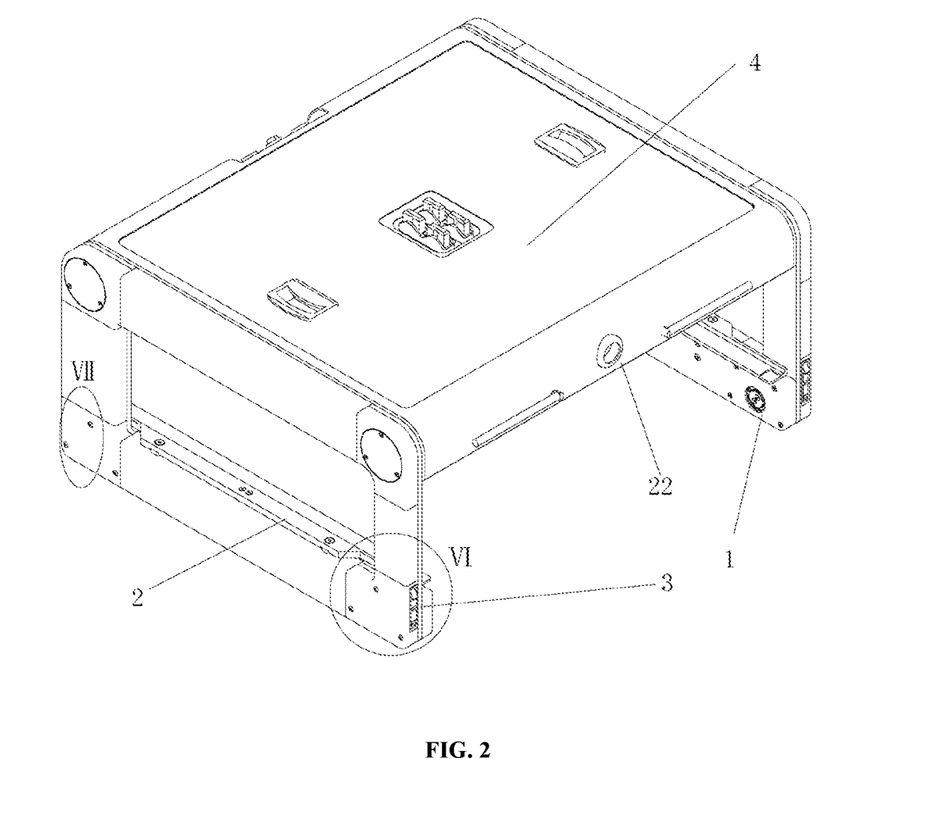
FIG. 2 is a schematic structural diagram of a multilayered rail guide system of the present disclosure.

The present disclosure is further described below with reference to the accompanying drawings and specific embodiments. FIG. 1 and FIG. 2 are schematic structural diagrams of a multilayered rail guide vehicle of the present disclosure. The multilayered rail guide vehicle includes a traveling devices 1, lifting devices 2, rescue devices 3, and an electric control system 4. The multilayered rail guide vehicle may move back and forth on a cultivation shelf load a cultivation board 6 and horizontally handle the cultivation board 6 to a designated cultivation position on a nutrient solution tank 7 for unloading. The cultivation positions are continuously distributed without gaps along the nutrient solution tanks 7, so dense planting of board planted crops can be realized.

The traveling device 1 is responsible for traveling driving and positioning of the rail guide vehicle in a horizontal direction, and is configured for completing stacked shelving and unshelving of the cultivation boards in the traveling direction of the rail guide vehicle; the lifting device 2 is responsible for lifting driving and positioning of the cultivation boards, and is configured for completing loading and unloading actions of the cultivation boards relative to the rail guide vehicle; the rescue device 3 is responsible for mechanical lapping between a rescue rail guide vehicle and a fault rail guide vehicle; when a certain rail guide vehicle cannot automatically run due to a fault, another rail guide vehicle may enter the layer where the where the fault rail guide vehicle is located to lap, tow, and drag the fault rail guide vehicle to realize emergency rescue; and the electric control system 4 is responsible for motion control and logic control of the rail guide vehicle to realize handling of the cultivation boards, the movement of the rail guide vehicle on the cultivation shelf, and the control of an emergency rescue operation.

Figure 3:
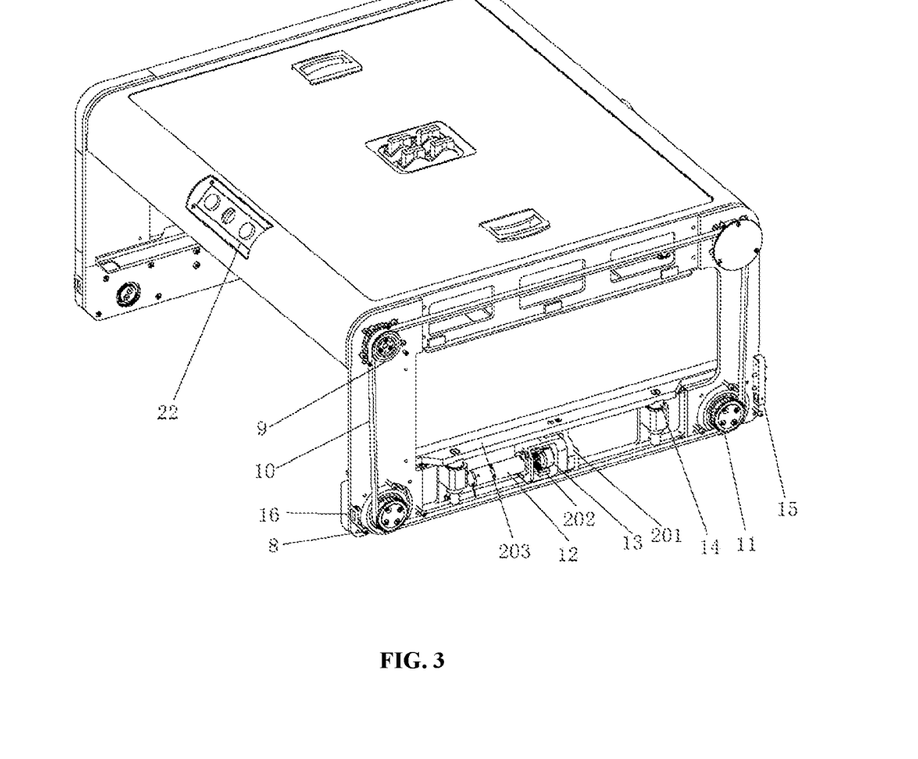
FIG. 3 is a structural diagram of a traveling device and a lifting device of a rail guide vehicle of the present disclosure.

As shown in FIG. 3, the traveling device 1 includes traveling wheels 8, belt pulleys 9, and synchronous belts 10; four traveling wheels 8 on both sides of the rail guide vehicle are symmetrically arranged; the four traveling wheels 8 are all driving wheels; a traveling servo motor drives the belt pulleys 9 on both sides of the body of the rail guide vehicle through a transmission shaft to tow two closed synchronous belt 10 to realize synchronous driving of the four traveling wheels, so that the friction force between the traveling wheels 8 and railways is effectively improved, and wheel system slipping caused by railway waterlogging is avoided, so that the start and stop of the rail guide vehicle is more stable, and the acceleration and the accuracy are higher. Wheel flanges 11 are arranged on the traveling wheels 8 on one side of the body of the rail guide vehicle, and are embedded into a guide groove of the cultivation shelf 5 to realize a guide effect in a traveling process of the rail guide vehicle.

There are two sets of lifting devices 2 in total, which are respectively arranged on the left side and the right side of the body of the rail guide vehicle, configured with eccentric mechanisms, and includes lifting motors 12, eccentric shaft mechanisms 13, and linear guide rods 14. The eccentric mechanisms (the eccentric shaft mechanisms 13) can be driven to perform cam motion by synchronously controlling the lifting motors 12 on both sides of the body of the rail guide vehicle, so as to realize loading and unloading of the cultivation boards.

Figure 4:
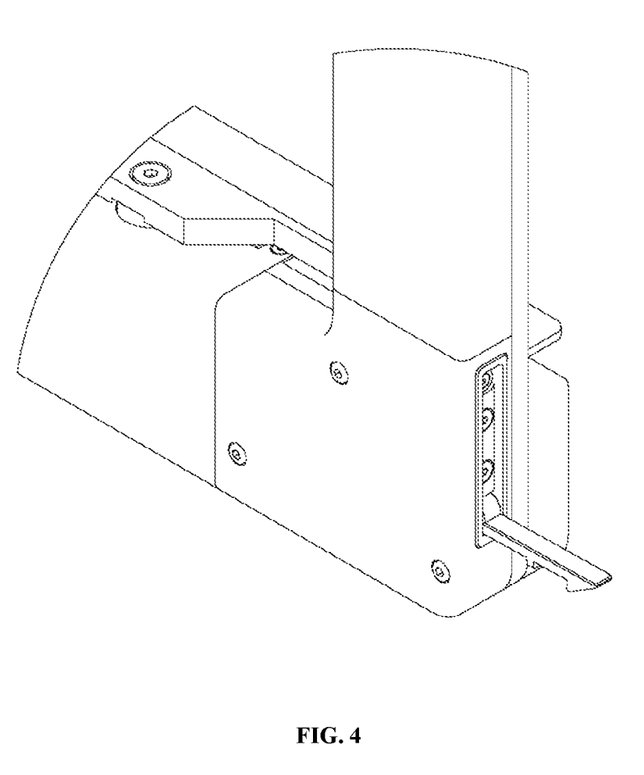
FIG. 4 is a schematic structural diagram of a butt hook of a rescue device of the rail guide vehicle of the present disclosure.
Figure 5:
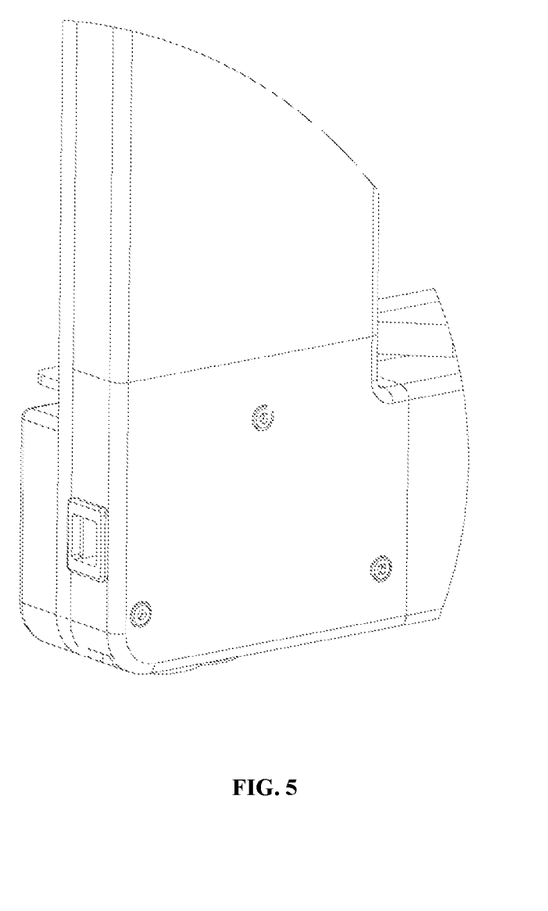
FIG. 5 is a schematic structural diagram of a butt slot of the rescue device of the rail guide vehicle of the present disclosure.

FIG. 4 and FIG. 5 are schematic structural diagrams of a butt hook and a butt slot of a rescue device of the rail guide vehicle of the present disclosure. The rescue device 3 includes a butt hook 15 and a butt slot 16 respectively arranged at a front end and a rear end of the body of the rail guide vehicle, and two sides of the body of the rail guide vehicle are symmetrically arranged two sets of the butt hook 15 and the butt slot 16. The butt hook 15 has a pawl structure at a front end thereof, has a stop block at a rear end thereof, is located in front of the body of the rail guide vehicle, and may realize a rigid connection after connected with the butt slot and realize the transferring of force in two opposite directions of dragging and braking. The butt slot 16 is in a boss form, and is located behind the body of the rail guide vehicle. The butt hook 15 may be closely engaged with the butt slot 16 after extending the butt slot 16.

A charging and maintenance portion is arranged on the cultivation shelf 5. The movement of the multi-shuffle between layers and shelves of the cultivation shelves may be realized by means of the transferring of peripheral handling equipment (an elevator, and an RGV).

The charging and maintenance portion is arranged at a fixed position of the lowest layer of the cultivation shelf, and is configured for charging or maintaining the body of a fault rail guide vehicle.

The elevator is docked with the front end of the cultivation shelf, is configured for loading the rail guide vehicle, and transfers between different layers of the cultivation shelf 5.

The RGV is arranged on the ground, is docked with the front end of the elevator, is configured for loading the rail guide vehicle, and transfers between different cultivation shelves.

Figure 6:
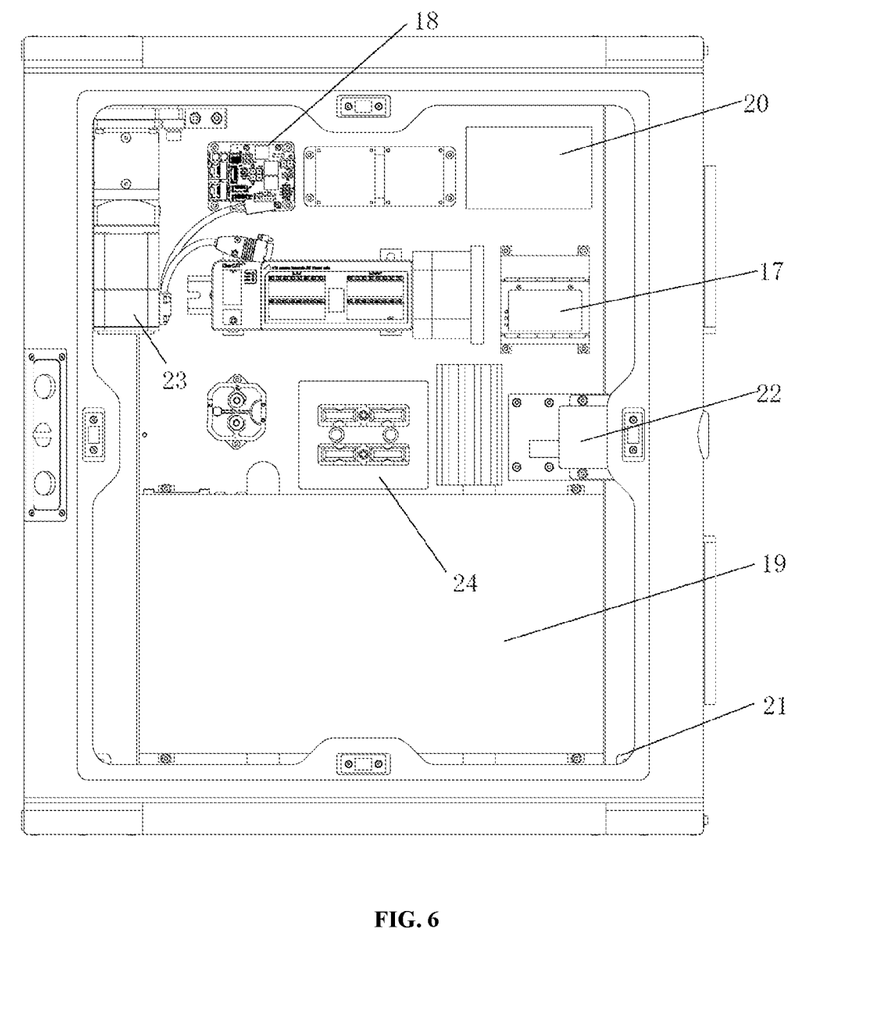
FIG. 6 is a layout schematic diagram of an electric control system of the present disclosure.
Figure 7:
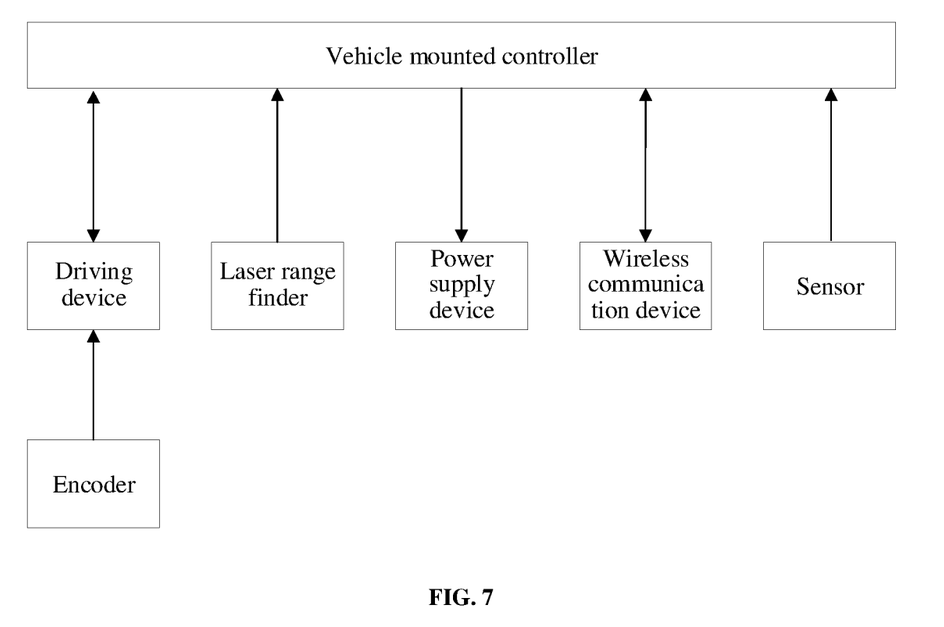
FIG. 7 is a schematic diagram of a structural connection of the electric control system of the present disclosure.

FIG. 7 is a schematic diagram of a structural connection of the electric control system of the present disclosure; the electric control system includes a vehicle mounted controller 17, and a traveling addressing device, a driving device 18, a wireless communication device 20 (wireless messaging device), and a sensor 21 communicated with the a vehicle mounted controller; and FIG. 6 shows a layout diagram of the electric control system 4 of the present disclosure, and the electric control system includes the vehicle mounted controller 17, the traveling addressing device, the driving device 18, a power supply device, the wireless communication device 20 (wireless messaging device), and the sensor 21.

The vehicle mounted controller 17 is a control core of a system. A PLC in a motion control type is selected, and is configured for motion control and logic control of the rail guide vehicle.

The traveling addressing device adopts a laser range finder 22 and an encoder 23.

The laser range finder 22 is mounted at an upper part of the body of the rail guide vehicle, takes a natural surface as a measurement reference plane, has the positioning resolution of up to 0.1 mm, and is configured for detecting an absolute position of the rail guide vehicle relative to the reference plane. A data update rate of the laser range finder is 50 Hz, the absolute position detected may be taken as a real-time position feedback to participate in closed-loop control of traveling positioning, and realize absolute position feedback-based full-closed loop positioning.

The encoder 23 is mounted in the traveling servo motor, and is configured for detecting a rotation angle of a motor shaft. The encoder has a high resolution, but cannot correct an accumulated positioning error caused by wheel system slipping. The encoder is used for velocity loop control in the system, and is configured as a position feedback source for short-range positioning in a case where absolute position positioning cannot be performed by using the laser range finder.

The driving device 18 is a DC servo driver, and is configured for executing a traveling command and a lifting command.

The power supply device takes a super capacitor 19 as an energy storage device for supplying power to the system. The charging velocity of the super capacitor 19 is extremely high, which can ensure very high continuous operation rate. The super capacitor 19 is charged from a charging polar plate via a current collector 24, and the current collector 24 is mounted on the top of the rail guide vehicle. The charging and maintenance portion is arranged on the frame of the lower layer of the cultivation shelf 5. The charging polar plate is mounted at the bottom of an upper frame of the charging and maintenance portion. On the rail guide vehicle, the on/off between the super capacitor 19 and the current collector 24 is controlled by using a contactor; and a coil of the contactor is powered by the current collector 24 and is controlled by an intermediate relay driven by a PLC. When the rail guide vehicle moves to position of the charging and maintenance portion, the current collector 24 is in contact with the charging polar plate, and the PLC controls the contactor to close, so that the super capacitor 19 starts to be charged. When the rail guide vehicle leaves the position of the charging and maintenance portion, the PLC cuts off the self-locking of the contactor through the intermediate relay, so that the charging circuit is cut off. Therefore, the current collector 24 is only energized during charging, which avoids a hidden danger of a short circuit caused by interpolar waterlogging of the current collector 24.

The wireless communication device 20 (the wireless messaging device) is a wireless client, and is configured for communication interaction between the vehicle mounted controller 17 and the upper computer.

The sensor 21 is configured for signal collection, state determination, and fault checking. Exposed sensors 21 all reach the protection level of IP67 or above. A photoelectric sensor can resist incandescent lamp interference light of 10000 lx, and can still work normally in an irradiation environment where cultivation light sources are red and blue highlight.

A control method for a multilayered rail guide vehicle system for three-dimensional planting in a plant factory includes the following steps:
1) an upper computer transmits a task instruction that needs to be executed to a vehicle mounted controller 17 by means of a wireless communication device 20 (a wireless messaging device) of an electric control system;
2) the vehicle mounted controller 17 obtains an operation mode and target information after receiving, by means of the wireless messaging device (the wireless communication device 20), the task instruction transmitted by the upper computer, and selects and switches a positioning mode of a driving device 18 according to the operation mode and the target information; and
3) the driving device 18 generates a driving current according to absolute position data fed back by a laser range finder 22 and code value data fed back by an encoder 23, and controls a traveling device 1 to perform traveling motion and a lifting device 2 to perform lifting motion.

The target information includes a target position and a target velocity for an operation of a body of a rail guide vehicle; and
the operation mode includes handling of cultivation boards on the same layer, handling of the cultivation boards between layers or shelves, and an emergency rescue operation, which are specifically as follows:
(1) handling cultivation boards on the same layer of the cultivation shelf to realize dense planting;
(2) moving between layers of the cultivation shelf or shelves of the cultivation shelves, so as to realize flexible arrangement and improve the utilization rate of the rail guide vehicle; and
(3) serving as a rescue rail guide vehicle to be combined and connected with a fault rail guide vehicle and drag the fault rail guide vehicle back.

The first type of operation and the third type of operation need to realize close fitting between cultivation boards and between the rescue rail guide vehicle and the fault rail guide vehicle without collision, the accuracy required for positioning is high, and overshooting is avoided.

The second type of operation and the third type of operation need to realize flexible positioning in a condition where absolute addressing cannot be realized by using fixed reference.

The third type of operation needs to automatically detect a position of the fault rail guide vehicle.

The operation content of the first type of operation (handling the cultivation boards on the same layer of the cultivation shelf to realize dense planting) includes the following items:

A shelving handling operation: when a shelving cultivation operation needs to be performed, the upper computer distributes target cultivation positions according to a first in and last out principle and assigns a shelving task to the rail guide vehicle. The traveling positions of the cultivation positions are set in the vehicle mounted controller. Since the cultivation positions are continuously distributed without gaps along the nutrient solution tank, the positions of adjacent cultivation positions are set at an interval of a length of one cultivation board. The cultivation board is handled to a cultivation board docking platform by means of the peripheral handling equipment first, then the rail guide vehicle travels to the docking platform to load the cultivation board on the platform, and then travels to a target cultivation position to place the cultivation board on the cultivation shelf for cultivation, that is, one shelving task is completed.

An unshelving handling operation: when a thinning or harvesting operation needs to be performed, the upper computer distributes target cultivation positions according to a first in and last out principle and assigns an unshelving task to the rail guide vehicle. The rail guide vehicle travels to the target cultivation position to load the cultivation board on the cultivation position first, and handles the cultivation board at the target cultivation position to the docking platform, that is, one unshelving task is completed. The cultivation board is then handled to a thinning operation area or a harvesting packing area by means of the peripheral handling equipment.

A second type of operation (moving between layers or shelves of the cultivation shelves, so as to realize flexible arrangement and improve the utilization rate of the rail guide vehicle) includes one item of operation content:

an interlayer handling operation: when the rail guide vehicle needs to perform a handling operation at different layers of the same cultivation shelf, transferring needs to be performed by means of the elevator. The upper computer determines a starting layer (a layer where the rail guide vehicle is located at the beginning) and a target layer (a layer where the rail guide vehicle arrives for a target) of transferring, and assigns a transferring command to each of the elevator and the rail guide vehicle. The elevator is butted with the starting layer first, and the rail guide vehicle travels into the elevator autonomously. The elevator loads the rail guide vehicle and is butted with the target layer of the cultivation shelf, and the rail guide vehicle autonomously travels into the target layer from the elevator.

When the rail guide vehicle needs to perform a handling operation between different cultivation shelves, an intermediate transferring link also needs the participation of an RGV in addition to the elevator. The upper computer determines a starting shelf (a cultivation shelf where the rail guide vehicle is located at the beginning), a starting layer, and a target shelf (a cultivation shelf where the rail guide vehicle arrives for a target), a target layer and assigns a transferring command to each of the elevator, the RGV, and the rail guide vehicle. The elevator on the starting shelf is butted with the starting layer first, the rail guide vehicle autonomously travels into the elevator, and then the RGV travels and is butted with the elevator on the starting shelf. The rail guide vehicle autonomously travels into the RGV, the RGV travels and is butted with the elevator on the target shelf after loading the rail guide vehicle, and the rail guide vehicle autonomously travels into the elevator from the RGV. The elevator on the target shelf is butted with the target layer, and the rail guide vehicle autonomously travels into the target layer from the elevator.

The third type of operation (serving as a rescue rail guide vehicle to be combined and connected with a fault rail guide vehicle and dragging the fault rail guide vehicle back) includes one item of operation content:

An emergency rescue operation: when a certain rail guide vehicle cannot autonomously run due to power depletion or hardware failure, the upper computer automatically selects another rail guide vehicle as a rescue rail guide vehicle for transferring, the transferring process of the other rail guide vehicle is the same as that of the second type of operation, and a target shelf and a target layer are the shelf and the layer where the fault rail guide vehicle is located. The upper computer assigns a transferring command to each of the elevator, the RGV, and a rescue rail guide vehicle to transport the rescue rail guide vehicle to a layer where the fault rail guide vehicle located by means of the peripheral handling equipment. The rescue rail guide vehicle travels to fit with the fault rail guide vehicle, and rescue devices of the two rail guide vehicles are automatically locked to form a combined body.

The combined body needs to continue transferring, the transferring process is the same as that of the second type of operation (moving between layers or shelves of the cultivation shelves, so as to realize flexible arrangement and improve the utilization rate of the rail guide vehicle), and a target shelf and a target layer are the shelf and the layer where the charging and maintenance portion is located. The upper computer assigns a transferring command to each of the elevator, the RGV, and a rescue rail guide vehicle. The rescue rail guide vehicle provides power for the combined body. The combined body travels into the peripheral handling equipment together. The peripheral handling equipment loads and transports the combined body to a layer where the charging and maintenance portion located. The combined body autonomously travels from the peripheral handling equipment into the charging and maintenance portion. After manually unlocking, the rescue rail guide vehicle may autonomously travel out to continue the first and second types of operations.

Figure 8:
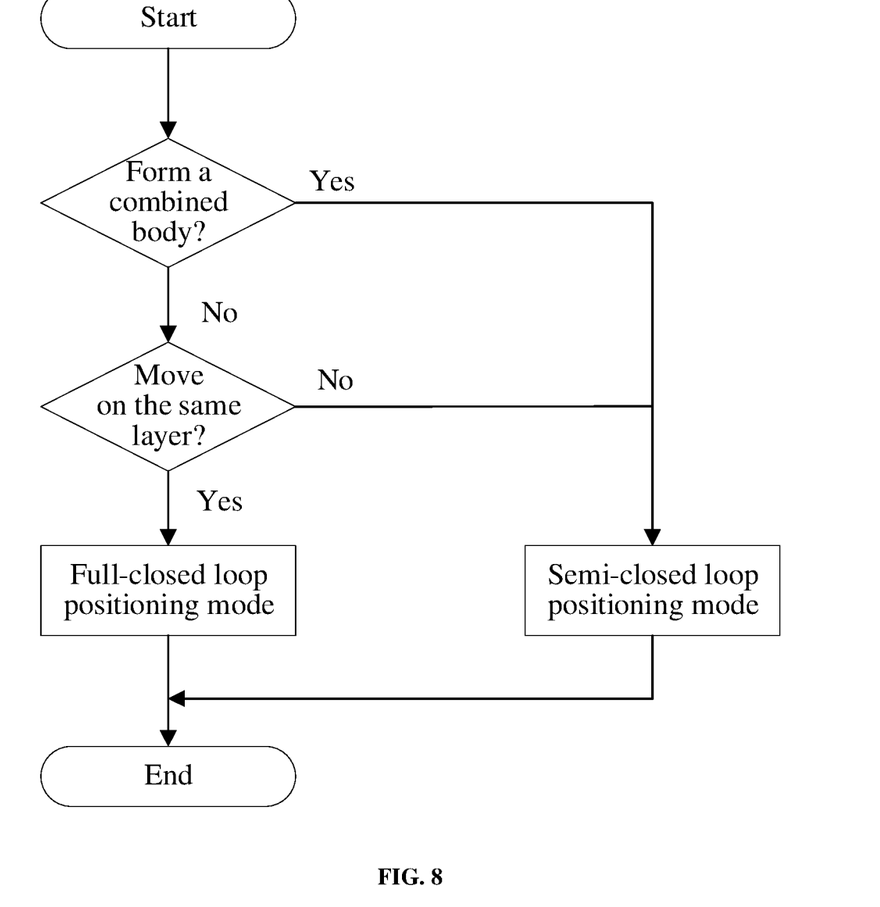
FIG. 8 is a program logic flowchart of a positioning mode selection of the electric control system of the present disclosure.

To achieve this objective, when the rail guide vehicle moves on the same layer of the cultivation shelf or butt positioning of emergency rescue is performed, the laser range finder 22 is taken as a position feedback source to realize full-closed loop positioning. When the rail guide vehicle moves between layers or shelves or positioning of emergency rescue combined body is performed, the encoder 23 is taken as a position feedback source to realize semi-closed loop positioning. Mode selection logic of full-closed loop positioning and semi-closed loop positioning is as shown in FIG. 8.

In order to realize flexible switching between a positioning mode and a position feedback source, as shown in FIG. 6, the feedback of the encoder 23 is communicated with the driving device 18, the feedback of the laser range finder 22 is communicated with the vehicle mounted controller 17, and the vehicle mounted controller 17 communicates with the driving device 18 through a real-time bus.

The positioning mode of the driving device 18 includes a full-closed loop positioning mode or a semi-closed loop positioning mode.

(1) Full-Closed Loop Positioning Mode

Figure 9:
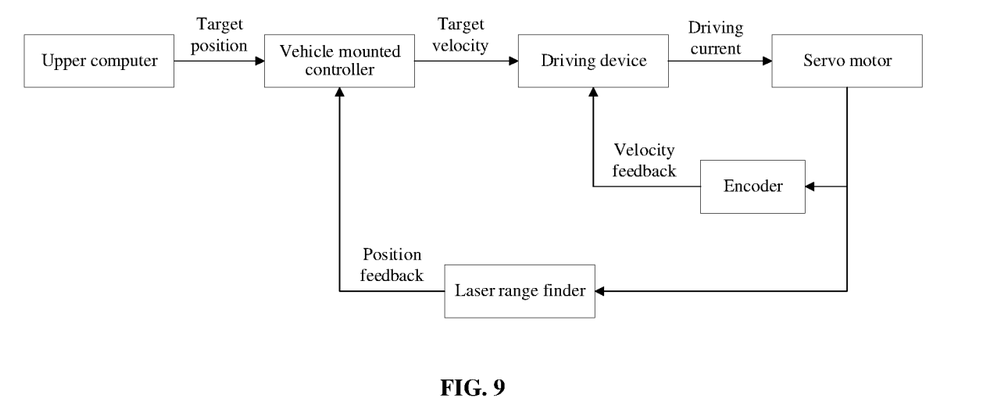
FIG. 9 is a control flowchart of a full-closed loop positioning mode of the present disclosure.

The control diagram of this mode is as shown in FIG. 9, the laser range finder 22 is taken as a position feedback source, and the vehicle mounted controller 17 is taken as a motion controller. The vehicle mounted controller 17 plans a velocity curve based on a Peer to Peer (PTP) positioning mode according to a given target position. The vehicle mounted controller 17 realizes position closed-loop control and dynamically adjusts a target velocity of a velocity loop based on a real-time position fed back by the laser range finder 22.

In this mode, the vehicle mounted controller 17 sets the driving device 18 to work in a Cyclic Velocity Mode. As a velocity controller, the driving device 18 synchronously follows a target velocity set by the vehicle mounted controller 17 in real time, and realizes velocity closed-loop control based on a real-time velocity converted by the encoder 23. The full closed-loop positioning does not have an accumulated error, and can ensure very high positioning accuracy and repetition accuracy.

When the rail guide vehicle performs the first type of operation, the laser range finder 22 takes a reflector mounted at a fixing position of a frame of the cultivation shelf 5 as a measurement reference plane. The target position is a preset absolute position of a target cultivation position, a docking platform, or a charging and maintenance portion. The full-closed loop positioning can ensure dense planting accuracy of the cultivation boards, and meanwhile, avoids a collision risk of the cultivation boards caused by overshooting of the rail guide vehicle.

When the rail guide vehicle performs the second type of operation, but only transfers between different layers of the same cultivation shelf, the laser range finder 22 takes a reflector mounted at a fixing position of a frame of the cultivation shelf 5 as a measurement reference plane. The target position is a preset absolute position of a cargo loading platform of the elevator. The full-closed loop positioning can ensure the traveling positioning accuracy of the rail guide vehicle, and meanwhile, avoids the risk of falling of the rail guide vehicle caused by overshooting.

When the rail guide vehicle performs the third type of operation, the laser range finder 22 takes a surface of a body of a fault rail guide vehicle as a measurement reference plane. The target position is a preset butt spacing, that is, an actual position of the fault rail guide vehicle is taken as a reference plane, and absolute positioning is performed at a fixed butt spacing. The full-closed loop positioning ensures the butt accuracy of the rescue rail guide vehicle and the fault rail guide vehicle, and meanwhile, avoids the collision risk between two rail guide vehicles caused by overshooting of the rail guide vehicle.

(2) Semi-Closed Loop Positioning Mode

Figure 10:
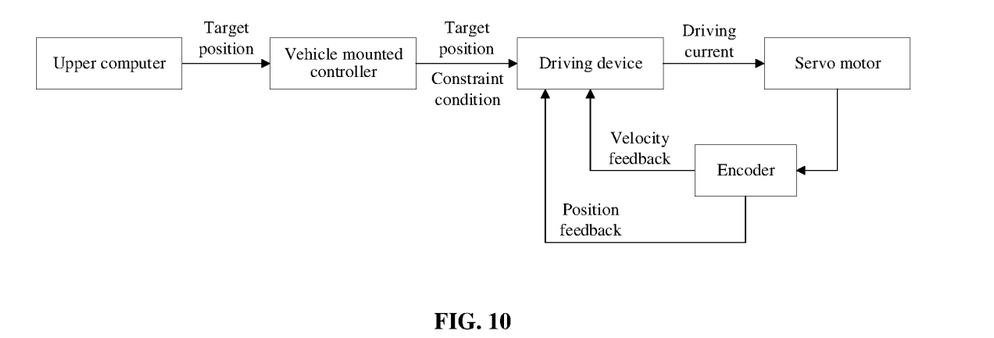

The control diagram of this mode is as shown in FIG. 10, the encoder 23 is taken as a position feedback source, and the driving device 18 is taken as a motion controller. The driving device 18 simultaneously realizes position closed-loop control and velocity closed-loop control based on the real-time position fed back and the converted real-time velocity by the encoder 23 according to the given target position.

In this mode, the vehicle mounted controller 17 sets the driving device 18 to work in a Profile Positioning Mode. The vehicle mounted controller 17 transmits the target position to the driving device 18 in a form of a code value, and meanwhile, sets constraint conditions such as a positioning velocity, an acceleration, a deceleration, a jerk, and S-curve time. The driving device 18 plans a positioning curve according to a constraint condition, and completes a positioning process based on the real-time feedback of the encoder 23.

When the rail guide vehicle performs the second type of operation, and transfers between different cultivation shelves, the rail guide vehicle enters and exists the RGV, and the target position is a preset absolute position of a cargo loading platform of the RGV relative to a cargo loading platform of the elevator. The absolute position is represented by a code value of the encoder 23.

In a third type of operation, after the rescue rail guide vehicle and the fault rail guide vehicle are butted to form the combined body, the rescue rail guide vehicle needs to tow the combined body to return to the peripheral handing equipment. The target position of the rescue rail guide vehicle is an initial absolute position relative to the fault rail guide vehicle when the rescue rail guide vehicle is transported to a layer where the fault rail guide vehicle located by means of the peripheral handing equipment. The absolute position is represented by a code value of the encoder 23.

The encoder 23 may accurately feed the actual position of the traveling wheel back based on the absolute positioning, which avoids a positioning deviation caused by fault emergency stop and manual dragging.

The multilayered rail guide vehicle system of the present technical solution is compact in structure, which can enter internal cultivation space for operation and take narrow and small space above crops as a running channel thereof, which greatly improves the utilization rate of planting space, conveniently takes an original planting facility as a traveling railway, which has low impact on a planting environment, and also has the characteristics of high flexibility and high maintainability by means of flexible transferring of the peripheral handling equipment.

The above introduces the multilayered rail guide vehicle system, an operation control method, and specific embodiments thereof in three-dimensional planting in a plant factory provided by the present disclosure. Variants or extensions made by those skilled in the art on the basis of the present disclosure also fall within the scope of the present disclosure.

What is claimed is:

1. A multilayered rail guide vehicle system for use in three-dimensional planting in a plant factory, comprising: an upper computer, cultivation shelves (5), an electric control system (4) and traveling devices (1) and lifting devices (2) communicated with the electric control system, wherein the traveling devices (1) and the lifting devices (2) are arranged in a body of a rail guide vehicle;

the upper computer is in wireless communication with the electric control system (4), and is configured for transmitting a task instruction to the electric control system (4);

a nutrient solution tank (7) is arranged on each of the cultivation shelves (5), and a plurality of cultivation positions are arranged on the nutrient solution tank (7); the rail guide vehicle takes the cultivation shelves (5) on both sides of the nutrient solution tank (7) as railways to carry cultivation boards (6) to move on the nutrient solution tank (7), and places the cultivation boards (6) at the cultivation positions;

the traveling devices (1) comprise two traveling devices and the lifting devices (2) comprise two lifting devices; the traveling devices (1) and the lifting devices (2) are symmetrically arranged on both sides of the rail guide vehicle respectively; the electric control system (4) is arranged in the body of the rail guide vehicle;

the traveling devices (1) are configured for receiving a control instruction of the electric control system (4), so that the body of the rail guide vehicle moves on the railways on the cultivation shelves (5);

the lifting devices (2) are configured for lifting the cultivation boards (6) and completing loading and unloading operations of the cultivation boards (6);

the electric control system (4) is configured for obtaining an operation mode and target information after receiving a task instruction transmitted by the upper computer, selecting and switching a positioning mode according to the operation mode and the target information, and controlling the traveling devices (1) to perform traveling motion; and a driving device (18) controls the lifting devices (2) to perform lifting motion;

the electric control system comprises a vehicle mounted controller (17), and a traveling addressing device, a driving device (18), a wireless messaging device (20), and a sensor (21) communicated with the vehicle mounted controller;

wherein, the traveling addressing device comprises a laser range finder (22) and an encoder (23);

the laser range finder (22) is arranged at an upper part of the body of the rail guide vehicle in the forward direction, is electrically connected with the vehicle mounted controller (17), and is configured for detecting an absolute position of the body of the rail guide vehicle relative to a reference plane, and feeding back data of the absolute position to the vehicle mounted controller (17);

the encoder (23) is connected with the driving device (18), and is configured for detecting a rotation angle of a motor shaft to obtain code value data and feeding back the code value data to the driving device (18) in real time;

the driving device (18) is a Direct Current (DC) servo driver, is electrically connected to each of a servo motor of the traveling device (1) and the lifting motor (12) of the lifting device (2), and is configured for switching a positioning mode of the driving device (18) according to a task instruction transmitted by the vehicle mounted controller (17) and controlling the traveling device (1) to perform the traveling motion and the lifting device (2) to perform the lifting motion;

the wireless messaging device (20) is a wireless client, and is configured for realizing communication interaction between the vehicle mounted controller (17) and the upper computer;

the sensor (21) is configured for collecting state information of the cultivation boards;

the vehicle mounted controller (17) is a Programmable Logic Controller (PLC) in a motion control type, and is configured for obtaining an operation mode and target information after receiving the task instruction transmitted by the upper computer by means of the wireless messaging device (20), selecting and switching the positioning mode of the driving device (18) according to the operation mode and the target information, and transmitting the task instruction transmitted by the upper computer to the driving device (18) according to the data of the absolute position fed back by the laser range finder (22) and the code value data fed back by the encoder (23);

the operation mode comprises handling of cultivation boards on a same layer, handling of the cultivation boards between layers or shelves, and an emergency rescue operation;

the target information comprises a target position and a target velocity of an operation of a body of a rail guide vehicle;

the positioning mode of the driving device (18) comprises a full-closed loop positioning mode or a semi-closed loop positioning mode;

the operation of selecting and switching a positioning mode of a driving device (18) according to the operation mode and the target information is specifically as follows:

when the operation mode is handling of the cultivation boards on the same layer, the laser range finder (22) takes a reflector mounted at the target position on a cultivation shelf (5) as a measurement reference plane; at a same time, the electric control system (4) works in the full-closed loop positioning mode;

when the operation mode is handling of the cultivation boards between layers, the laser range finder (22) takes a reflector mounted at the target position on a cultivation shelf (5) as a measurement reference plane; at a same time, the electric control system (4) works in the full-closed loop positioning mode;

when the operation mode is handling of the cultivation boards between shelves, the body of the rail guide vehicle enters and exists a Rail Guide Vehicle (RGV); and at a same time, the electric control system (4) works in the semi-closed loop positioning mode.

2. The multilayered rail guide vehicle system for use in three-dimensional planting in a plant factory according to claim 1, wherein each of the traveling devices (1) is arranged on one side of the body of the rail guide vehicle, and comprises two traveling wheels (8), two belt pulleys (9), a synchronous belt (10), and a servo motor;

the two traveling wheels (8) are respectively and fixedly arranged at a bottom of one side of the body of the rail guide vehicle; the two belt pulleys (9) are respectively and fixedly arranged at a top of one side of the body of the rail guide vehicle;

the two traveling wheels (8) are in transmission connection with the two belt pulleys (9) through the synchronous belt (10), so as to realize synchronous rotation;

the two belt pulleys (9) are connected to the servo motor, and the servo motor is electrically connected to the electric control system (4); and a wheel flange (11) is arranged on each of the two traveling wheels (8), so that the two traveling wheels (8) are embedded into one of the cultivation shelves (5) on both sides of the nutrient solution tank (7), to realize a guide effect in a traveling process of the body of the rail guide vehicle.

3. The multilayered rail guide vehicle system for use in three-dimensional planting in a plant factory according to claim 1, wherein each of the lifting devices (2) comprises a lifting motor (12), an eccentric shaft mechanism (13), linear guide rods (14), a lifting block (201), and a lifting board (203);

the lifting motor (12) is electrically connected to the electric control system (4);

an output shaft of the lifting motor (12) is connected to an input shaft segment of the eccentric shaft mechanism (13) via a shaft coupling (202); an output shaft segment of the eccentric shaft mechanism (13) is abutted with the lifting block (201); the lifting motor (12) drives an eccentric wheel to rotate, so that the output shaft segment is displaced up and down, thereby ascending or descending the lifting block (201);

the lifting block (201) is fixedly connected to a midpoint of a bottom of the lifting board (203), so as to drive the lifting board (203) to ascend or descend by means of the ascending or the descending of the lifting block (201);

the linear guide rods (14) are also arranged at two ends of the bottom of the lifting board (203); and the linear guide rods (14) are configured for providing guide for the ascending or the descending of the lifting board (203).

4. The multilayered rail guide vehicle system for use in three-dimensional planting in a plant factory according to claim 1, further comprising rescue devices (3) communicated with the electric control system (4), wherein the rescue devices (3) comprise two rescue devices, and are symmetrically arranged on both sides of the body of the rail guide vehicle, and are configured for lapping a body of another rail guide vehicle, so that the rail guide vehicle and the other rail guide vehicle are able to tow each other, so as to realize an emergency rescue operation of the rail guide vehicle; each of the rescue devices (3) comprises butt hooks (15) and butt slots (16);

the butt hooks (15) are rotatably arranged on both sides of the body of the rail guide vehicle in a forward direction, and the butt hooks (15) are able to horizontally extend to outside of the body of the rail guide vehicle; pawl parts are arranged at extending front ends of the butt hooks (15), and stop blocks are arranged at extending rear ends of the butt hooks (15);

the butt slots (16) are arranged on both sides of the body of the rail guide vehicle in a backward direction, and boss structures are arranged in the butt slots (16);

after the butt hooks (15) of the rail guide vehicle extend out, the butt hooks (15) of the rail guide vehicle are horizontally inserted into butt slots (16) of rescue devices of the body of the other rail guide vehicle; and after front ends of the pawl parts of the rail guide vehicle slide over the boss structures of the other rail guide vehicle, the stop blocks at rear ends of the rail guide vehicle are engaged with the boss structures of the other rail guide vehicle, so as to realize interlocking between the body of the rail guide vehicle and the body of the other rail guide vehicle.

5. A control method for a multilayered rail guide vehicle system for use in three-dimensional planting in a plant factory according to claim 1, comprising following steps:

1) Transmitting, by an upper computer, a task instruction that needs to be executed to a vehicle mounted controller (17) by means of a wireless messaging device (20) of an electric control system;

2) Obtaining an operation mode and target information by the vehicle mounted controller (17) after receiving the task instruction transmitted by the upper computer by means of the wireless messaging device, and selecting and switching a positioning mode of a driving device (18) according to the operation mode and the target information; and 3) Generating, by the driving device (18), a driving current according to data of an absolute position fed back by a laser range finder (22) and code value data fed back by an encoder (23), and controlling a traveling device (1) to perform traveling motion and a lifting device (2) to perform lifting motion.

6. The control method for a multilayered rail guide vehicle system for use in three-dimensional planting in a plant factory according to claim 5, wherein the full-closed loop positioning mode is specifically as follows:

receiving, by the vehicle mounted controller (17), an absolute position fed back by the laser range finder (22) in real time according to the operation mode and the target information in the task instruction received, and dynamically adjusting the target velocity in real time according to a deviation between the absolute position and a current position, and transmitting the target velocity to the driving device (18);

detecting, by the encoder (23), a rotation angle of a motor shaft in a traveling device, acquiring, by the driving device (18), the code value data and calculating to obtain a real-time velocity of the body of the rail guide vehicle, dynamically adjusting the driving current in real time according to a velocity deviation between the real-time velocity and the target velocity, and controlling the traveling device (1) to perform the traveling motion; and controlling, by the driving device (18), the lifting device (2) to perform the lifting motion to complete control of the full-closed loop positioning mode.

7. The control method for a multilayered rail guide vehicle system for use in three-dimensional planting in a plant factory according to claim 5, wherein the semi-closed loop positioning mode is specifically as follows:

transmitting, by the vehicle mounted controller (17), the target information to the driving device (18) according to the task instruction received; feeding back, by the encoder (23), the code value data to the driving device (18) in real time, and calculating by the driving device (18) according to the target information and the code value data received to obtain a real-time position and a real-time velocity;

obtaining, by the driving device (18), a position deviation and a velocity deviation according to the real-time position and the real-time velocity, and outputting the driving current, so as to control the traveling device (1) to perform the traveling motion; and controlling, by the driving device (18), the lifting device (2) to perform the lifting motion to complete control of the semi-closed loop positioning mode.

* * * * *